US012257852B2

(12) United States Patent
Kurosu

(10) Patent No.: US 12,257,852 B2
(45) Date of Patent: Mar. 25, 2025

(54) INK SUPPLY DEVICE AND IMAGE FORMING APPARATUS

(71) Applicant: Konica Minolta, Inc., Tokyo (JP)

(72) Inventor: Shigetaka Kurosu, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 211 days.

(21) Appl. No.: 18/310,857

(22) Filed: May 2, 2023

(65) Prior Publication Data

US 2023/0364920 A1 Nov. 16, 2023

(30) Foreign Application Priority Data

May 13, 2022 (JP) ................................ 2022-079504

(51) Int. Cl.
*B41J 2/175* (2006.01)
*B41J 29/377* (2006.01)

(52) U.S. Cl.
CPC ....... *B41J 2/17596* (2013.01); *B41J 2/17553* (2013.01); *B41J 29/377* (2013.01)

(58) Field of Classification Search
CPC .... B41J 2/175; B41J 2/17503; B41J 2/17506; B41J 2/17509; B41J 2/1752; B41J 2/17523; B41J 2/17553; B41J 2/17596
See application file for complete search history.

(56) References Cited

U.S. PATENT DOCUMENTS

2010/0066785 A1* 3/2010 Yamada .................. B41J 2/175 347/18
2016/0101625 A1* 4/2016 Tokimatsu ........... B41J 2/16517 347/25

FOREIGN PATENT DOCUMENTS

JP 2003-326681 A 11/2003

* cited by examiner

*Primary Examiner* — Anh T Vo
(74) *Attorney, Agent, or Firm* — LUCAS & MERCANTI, LLP

(57) ABSTRACT

An ink supply device includes: a main tank that stores ink; a sub-tank that stores the ink supplied from the main tank and supplies the ink stored to a plurality of inkjet heads connected; and a heater that heats the ink before the ink flows into the sub-tank, wherein the heater includes a plurality of ink outlet ports that can supply the ink with different temperatures to the sub-tank midway in a flow path of the ink to be heated.

10 Claims, 8 Drawing Sheets

17A, 17C

17

INK SUPPLY DEVICE AND IMAGE FORMING APPARATUS

The entire disclosure of Japanese patent Application No. 2022-079504, filed on May 13, 2022, is incorporated herein by reference in its entirety.

BACKGROUND

Technological Field

The present invention relates to an ink supply device and an image forming apparatus.

Description of the Related Art

Conventionally, there has been known an inkjet image forming apparatus that forms an image on a recording medium by ejecting ink from an inkjet head.

Furthermore, a relatively large inkjet image forming apparatus includes an ink supply device in which a plurality of tanks containing ink are connected by tubes to form an ink flow path for transferring the ink, and the ink is supplied to an inkjet head from an upstream tank through a downstream tank.

Such an inkjet image forming apparatus has a problem that the temperature of the ink ejected from the nozzles of a plurality of inkjet heads varies, and thus the quality of an image printed on a recording medium is deteriorated.

In order to cope with the problem, for example, JP 2003-326681 A discloses an inkjet recording apparatus that includes a heat controller heating or cooling the temperature in an inkjet head regardless of use in a tropical area or a cold area to maintain the temperature at an appropriate temperature, and the temperature of the ejected ink can be adjusted.

However, the inkjet image forming apparatus including the ink supply device described above has a problem that, in a case where the temperature of ink is set to a temperature different from the initially set temperature in order to eliminate the variation in the temperature of the ink of the inkjet head, the temperature of a temperature adjustment unit is changed to a different temperature, and thus the time for heating is required and it cannot be immediately coped with.

SUMMARY

An object of the present invention is to provide an ink supply device and an image forming apparatus that quickly supply ink with a viscosity suitable for ejection to an inkjet head to suppress the temperature unevenness of the ink.

To achieve the abovementioned object, according to an aspect of the present invention, an ink supply device reflecting one aspect of the present invention comprises: a main tank that stores ink; a sub-tank that stores the ink supplied from the main tank and supplies the ink stored to a plurality of inkjet heads connected; and a heater that heats the ink before the ink flows into the sub-tank, wherein the heater includes a plurality of ink outlet ports that can supply the ink with different temperatures to the sub-tank midway in a flow path of the ink to be heated.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

Figure 1:
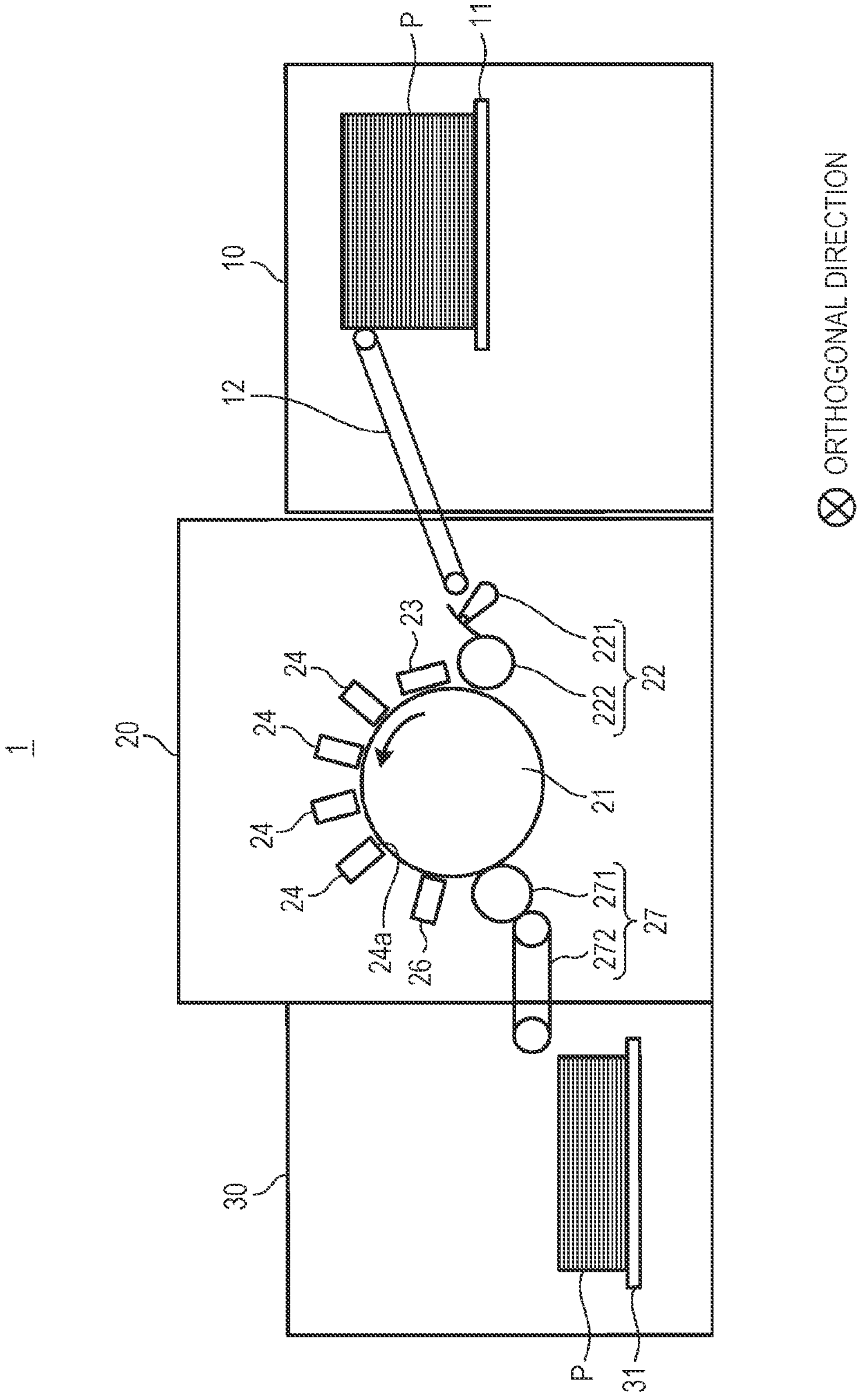
FIG. 1 is a diagram illustrating a schematic configuration of an inkjet image forming apparatus including an ink supply device according to a first embodiment.

FIG. 1 is a schematic configuration diagram illustrating an example of an inkjet image forming apparatus 1 including an ink supply device 15 in a first embodiment.

The inkjet image forming apparatus 1 includes a sheet feeder 10, an image forming unit 20, a sheet ejector 30, a controller 40 (see FIG. 2), and the like. Under the control of the controller 40, the inkjet image forming apparatus 1 conveys a recording medium P stored in the sheet feeder 10 to the image forming unit 20, forms an image on the recording medium P in the image forming unit 20, and conveys (discharges) the recording medium P having the image formed thereon to the sheet ejector 30.

As the recording medium P, in addition to paper such as plain paper or coated paper, various media capable of fixing ink landed on the surface, such as fabric or sheet-like resin, can be used.

The sheet feeder 10 includes a sheet feeding tray 11 that stores the recording medium P and a medium feeder 12 that conveys and supplies the recording medium P from the sheet feeding tray 11 to the image forming unit 20.

The sheet feeding tray 11 is a plate-like member on which one or a plurality of recording media P can be placed. The sheet feeding tray 11 is provided to move up and down depending on the amount of the recording media P placed on the sheet feeding tray 11, and is held at a position where the uppermost recording medium P is conveyed by the medium feeder 12 in a vertical movement direction.

The medium feeder 12 includes an annular belt whose inside is supported by two rollers, and conveys the recording medium P from the sheet feeding tray 11 to the image forming unit 20 by rotating the rollers in a state where the recording medium P is placed on the belt.

The image forming unit 20 includes a conveyance drum 21, a transfer unit 22, a medium heating unit 23, an ink head unit (hereinafter, referred to as "head unit") 24, a fixing unit 26, and a delivery unit 27.

In a state where the recording medium P is held on an outer peripheral curved surface (a conveyance surface) with a cylindrical surface shape, the conveyance drum 21 rotates about a rotation axis extending in a direction perpendicular to the paper surface of FIG. 1 (hereinafter, referred to as "orthogonal direction"), thereby conveying the recording medium P in a conveyance direction along the conveyance surface (see an arrow in FIG. 1).

The conveyance drum 21 includes a claw and an intake unit (both not illustrated) for holding the recording medium P on the conveyance surface. The end of the recording medium P is pressed by the claw and the recording medium P is attracted to the conveyance surface by the intake unit, so that the recording medium P is held on the conveyance surface.

The conveyance drum 21 incudes a conveyance drum motor (not illustrated) for rotating the conveyance drum 21, and rotes by an angle proportional to the amount of rotation of the conveyance drum motor. The conveyance drum 21 and the conveyance drum motor function to convey the recording medium P so as to face an inkjet head 242 (see FIGS. 2 and 3) of the head unit 24.

The transfer unit 22 delivers the recording medium P conveyed by the medium feeder 12 of the sheet feeder 10 to the conveyance drum 21. The transfer unit 22 is provided at a position between the medium feeder 12 of the sheet feeder 10 and the conveyance drum 21, holds and picks up one end of the recording medium P conveyed from the medium feeder 12 by a swing arm unit 221, and delivers the recording medium P to the conveyance drum 21 via a transfer drum 222.

The medium heating unit 23 is provided between the position where the transfer drum 222 is disposed and the arrangement position of the head units 24, and heats the conveyance surface of the conveyance drum 21 and the recording medium P so that the recording medium P conveyed by the conveyance drum 21 has a temperature within a predetermined range. The medium heating unit 23 includes, for example, an infrared heater or the like, and supplies power to the infrared heater on the basis of a control signal supplied from the controller 40 (see FIG. 2), thereby causing the infrared heater to generate heat.

The head unit 24 ejects ink onto the recording medium P from a nozzle opening (hereinafter, referred to as "nozzle") provided in an ink ejection surface facing the conveyance surface of the conveyance drum 21 at a suitable timing based on the rotation of the conveyance drum 21 holding the recording medium P to record (form) an image. The head unit 24 is disposed in such a manner that the ink ejection surface (hereinafter, referred to as "nozzle surface 24*a*") and the conveyance surface are separated by a predetermined distance.

In the inkjet image forming apparatus 1 in the present embodiment, the number of the head units 24 is four, and the four head units correspond to ink of four colors of yellow (Y), magenta (M), cyan (C), and black (K), respectively. The four head units 24 are arranged at predetermined intervals in the order of Y, M, C, and K from the upstream side in the conveyance direction of the recording medium P.

Figure 2:
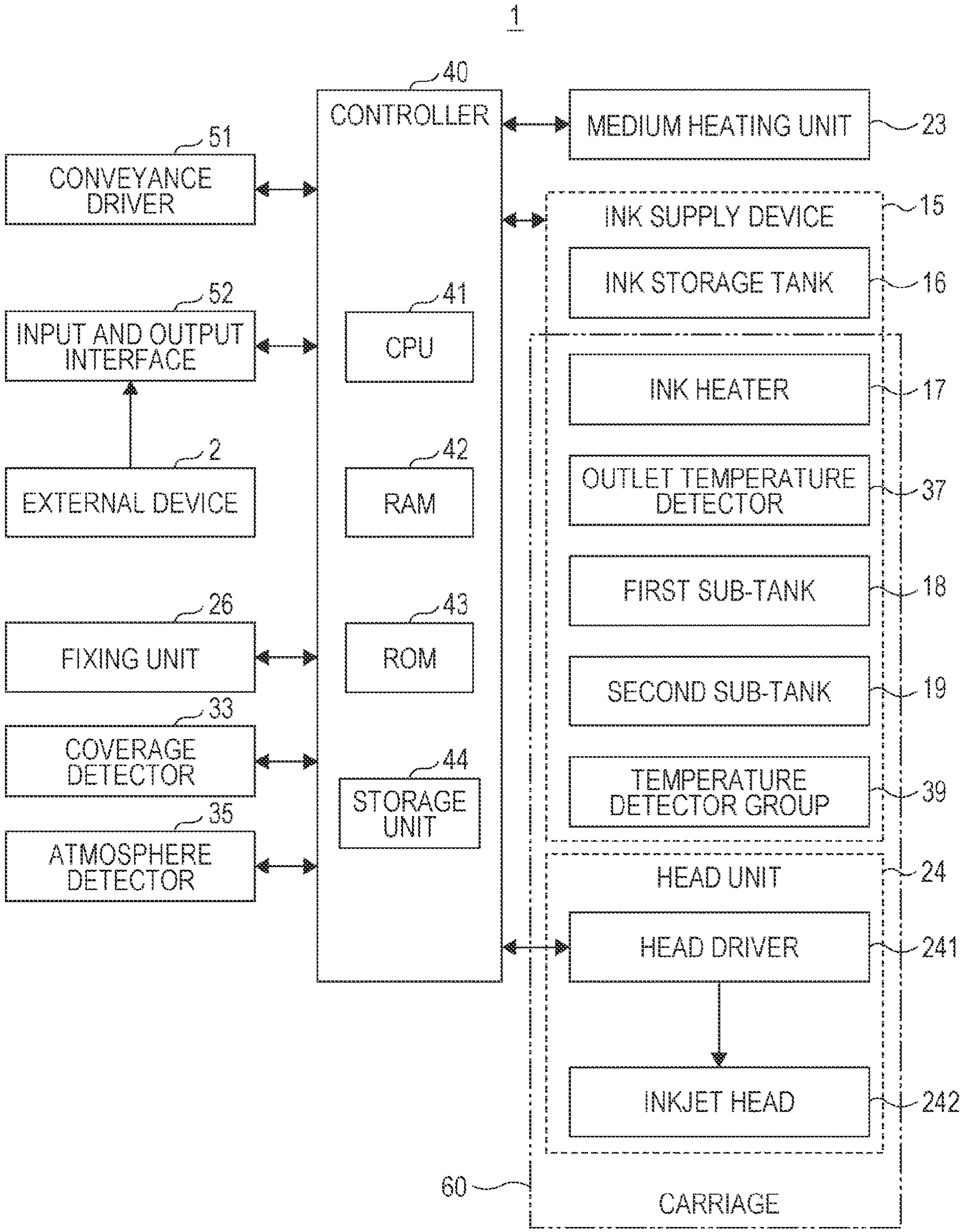
FIG. 2 is a block diagram illustrating a main functional configuration of the inkjet image forming apparatus in the first embodiment.

Each head unit 24 includes the inkjet head 242 (see FIG. 2). The inkjet head 242 includes a plurality of recording elements each including a pressure chamber storing ink, a piezoelectric element provided on the wall surface of the pressure chamber, and a nozzle. In this recording element, when a drive signal for deforming the piezoelectric element is input, the pressure chamber is deformed by the deformation of the piezoelectric element, the pressure in the pressure chamber changes, and the ink is ejected from a nozzle communicating with the pressure chamber.

The arrangement range in the orthogonal direction of the nozzles included in the inkjet head 242 covers the width in the orthogonal direction of the area where the image is formed in the recording medium P conveyed by the conveyance drum 21. The head unit 24 is used with its position fixed with respect to the rotation axis of the conveyance drum 21 at the time of image formation. That is, the inkjet image forming apparatus 1 is a single-pass apparatus.

Figure 3:
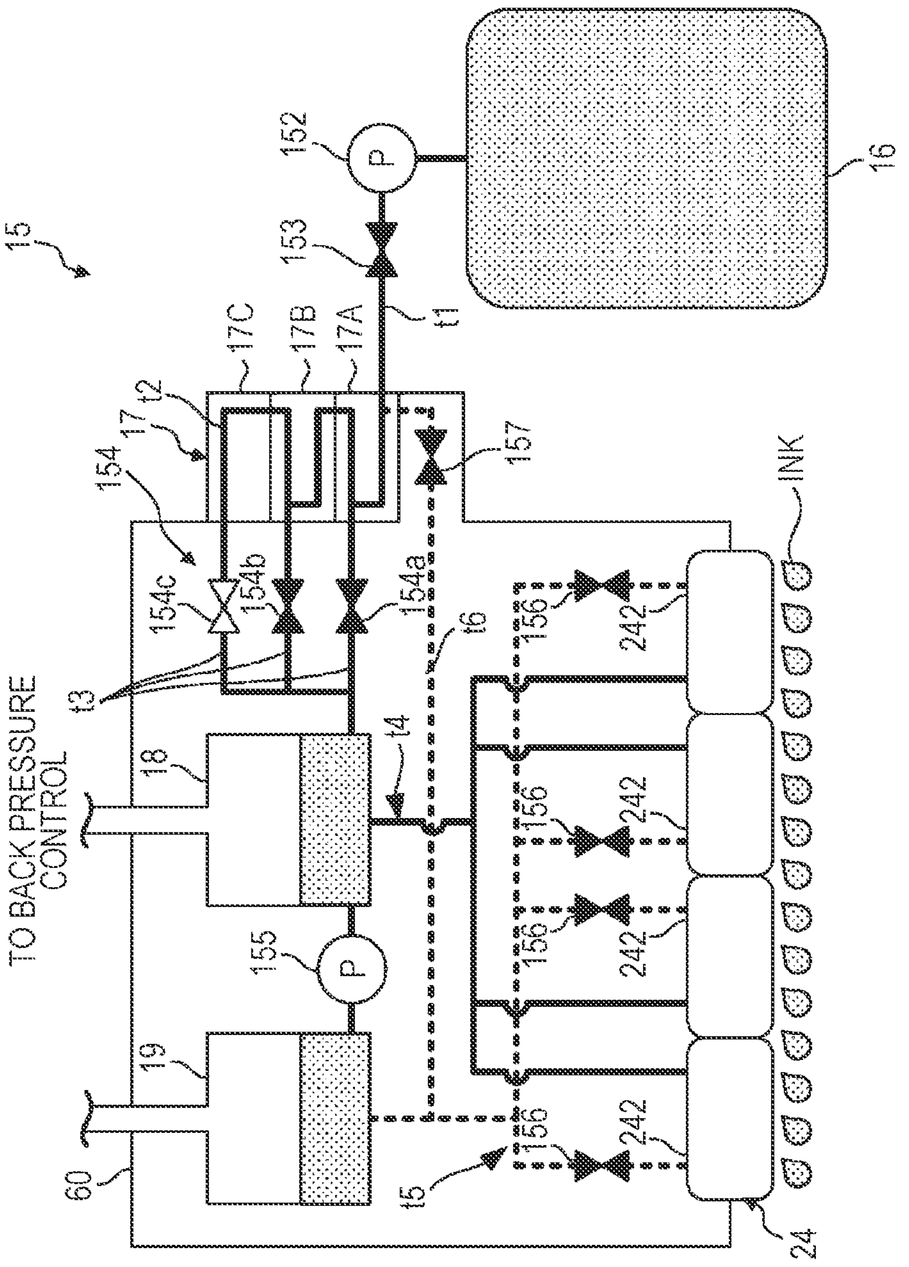
FIG. 3 is a schematic diagram for explaining a schematic configuration of the ink supply device in the first embodiment.

The head unit 24 is mounted on a carriage 60 (see FIG. 3). The carriage 60 is configured to be movable in a predetermined direction by a head conveyance mechanism (not illustrated). Details of the carriage 60 will be described later.

The head conveyance mechanism moves the head unit 24 (the carriage 60) as follows under the control of the controller 40. That is, at the time of image formation, the head conveyance mechanism moves the nozzle surface 24*a* of the inkjet head 242 to a position (a printing area) facing the peripheral surface of the conveyance drum 21. On the other hand, at the time of various types of maintenance, the head conveyance mechanism moves the nozzle surface 24*a* of the inkjet head 242 to a position (a maintenance area) facing a cleaning device (not illustrated).

The fixing unit 26 includes a light emission unit disposed over the width of the conveyance drum 21 in the orthogonal direction. Under the control of the controller 40, the fixing unit 26 irradiates the recording medium P placed on the conveyance drum 21 with energy rays such as ultraviolet rays from the light emission unit. The light emission unit of the fixing unit 26 applies predetermined energy to the ink ejected on the recording medium P, thereby curing and fixing the ink on the recording medium P.

The delivery unit 27 includes a belt loop 272 having an annular belt whose inside is supported by two rollers, and a cylindrical transfer drum 271 transferring the recording medium P from the conveyance drum 21 to the belt loop 272. The delivery unit 27 conveys the recording medium P transferred onto the belt loop 272 from the conveyance drum 21 by the transfer drum 271 using the belt loop 272, and sends the recording medium P to the sheet ejector 30.

The sheet ejector 30 includes a plate-like sheet ejection tray 31 on which the recording medium P sent from the image forming unit 20 by the delivery unit 27 is placed.

FIG. 2 is a block diagram illustrating a main functional configuration of the inkjet image forming apparatus 1. The inkjet image forming apparatus 1 includes the medium heating unit 23, an inkjet head driver ("head driver" in the drawing) 241 and the inkjet head 242 included in the head unit 24, the fixing unit 26, a coverage detector 33, an atmosphere detector 35, the controller 40, a conveyance driver 51, an input and output interface 52, and the ink supply device 15 to be described later. The coverage detector 33 detects the coverage amount of the recording medium P and outputs the coverage amount to the controller 40. Depending on the coverage amount, the amount of ink to be used increases and the temperature of ink in the inkjet head 242 increases. The atmosphere detector 35 detects an internal temperature at which the head unit 24 (the carriage 60) is disposed. The atmosphere detector 35 includes a temperature sensor such as a thermistor, and outputs the detected internal temperature to the controller 40. The atmosphere detector 35 may be another element or device that can be used to detect a temperature other than the thermistor.

The inkjet head driver 241 supplies a drive signal for deforming a piezoelectric element based on image data to the recording element of the inkjet head 242 at a suitable timing on the basis of the control of the controller 40. As a result, the inkjet head driver 241 causes the nozzles of the inkjet head 242 to eject an amount of ink corresponding to the pixel value of the image data. In practice, a plurality of the inkjet heads 242 are arranged in the head unit 24.

The controller 40 functions to control the entire inkjet image forming apparatus 1. The controller 40 includes a central processing unit (CPU) 41, a random access memory (RAM) 42, a read only memory (ROM) 43, and a storage unit 44.

The CPU 41 reads various control programs and setting data stored in the ROM 43, stores the programs and the setting data in the RAM 42, and executes the programs to perform various arithmetic processing. In addition, the CPU 41 integrally controls the entire operation of the inkjet image forming apparatus 1.

The RAM 42 provides the CPU 41 with a working memory space and stores temporary data. The RAM 42 may include a nonvolatile memory.

The ROM 43 stores various control programs executed by the CPU 41, setting data, and the like. Instead of the ROM 43, a rewritable nonvolatile memory such as an electrically erasable programmable read-only memory (EEPROM) or a flash memory may be used.

The storage unit 44 stores a print job (a print command) input from an external device 2 via the input and output interface 52 and image data related to the print job. As the storage unit 44, for example, a hard disk drive (HDD) is used, and a dynamic random access memory (DRAM) or the like may be used in combination.

The conveyance driver 51 supplies a drive signal to the conveyance drum motor of the conveyance drum 21 on the basis of the control signal supplied from the controller 40 to rotate the conveyance drum 21 at a predetermined speed and timing. Furthermore, the conveyance driver 51 supplies a drive signal to a motor for operating the medium feeder 12, the transfer unit 22, and the delivery unit 27 on the basis of a control signal supplied from the controller 40. As a result, the motor that has received the drive signal supplies the recording medium P to the conveyance drum 21 and discharges the recording medium P from the conveyance drum 21.

The input and output interface 52 mediates the transmission and reception of data between the external device 2 and the controller 40. The input and output interface 52 includes, for example, any one of various serial interfaces and various parallel interfaces, or a combination thereof.

The external device 2 is, for example, a personal computer, and supplies an image forming command (a print job), image data, and the like to the controller 40 via the input and output interface 52.

The ink supply device 15 stores the ink to be used in the inkjet image forming apparatus 1 in advance, and supplies the ink toward the inkjet head 242 described above while adjusting (controlling) the temperature of the ink at the time of printing.

In the present embodiment, the ink that changes in phase between a gel state and a liquid state depending on the temperature is used. For example, the energy ray irradiation ink such as UV ink that is in a gel state at normal temperature, changes to a liquid state by being heated, and solidifies by being irradiated with energy rays at the time of image formation can be used.

As the main configuration of the ink supply device 15, as illustrated in FIG. 2, an ink storage tank 16 for storing ink, an ink heater 17, a first sub-tank 18, a second sub-tank 19, an outlet temperature detector 37, and a temperature detector group 39 are provided in order from the upstream side of the ink flow path.

In the present embodiment, the ink storage tank 16 corresponds to "main tank" of the present invention. In the ink supply device 15, in particular, the ink heater 17 heats and raises the temperature of the ink flowing through the ink flow path from the ink storage tank 16 to the first sub-tank 18, and appropriately supplies the ink with different temperatures to the inkjet head 242 through the first sub-tank 18. A back pressure (a negative pressure) within a certain range is applied to the ink in the inkjet head 242 connected to the first sub-tank 18 through the first sub-tank 18 by back pressure control. As a result, the meniscus of the ink is held in a state of being drawn into the nozzle so that the ink is suitably ejected.

Next, a more specific configuration of the ink supply device 15 will be described with reference to FIG. 3.

FIG. 3 is a schematic diagram for explaining a schematic configuration of the ink supply device in the first embodiment. FIG. 3 illustrates an ink supply device per color in the inkjet image forming apparatus 1. Specifically, FIG. 3 illustrates the carriage 60 having one of the four head units 24 illustrated in FIG. 1, and the ink heater 17 corresponding thereto.

As illustrated in FIG. 3, in the ink supply device 15, a flow path or a circuit for circulating ink is formed by connecting tubes t (t1, t3 to t6) serving as an ink flow path between the components (16 to 19) described above and to an outlet and an inlet of the inkjet head 242. Such tubes will be described later in detail.

The components (16 to 19) of the ink supply device 15 and the predetermined tubes t include pumps 152 and 155, electromagnetic valves (flow path valves) 153, 154*a* to 154*c*, and 156 which are valves, and the like. By the pumps 152 and 155, the electromagnetic valves 153, 154*a* to 154*c*, 156, and the like being operated by the control of the controller 40, the ink is supplied from the most upstream ink storage tank 16 to the inkjet head 242 via each unit on the downstream side.

Predetermined tanks in the ink supply device 15, for example, the first sub-tank 18 and the second sub-tank 19 include a heating source (not illustrated) such as a heater for heating the flowing ink. These heating sources are provided, for example, so as to be in contact with the outer peripheral surface of each tank (18, 19).

Furthermore, predetermined tanks in the components (16 to 19) of the ink supply device 15 described above or predetermined tubes t include a temperature sensor (including the outlet temperature detector 37 and the temperature detector group 39) such as a thermistor that detects an ink temperature.

Figure 4:
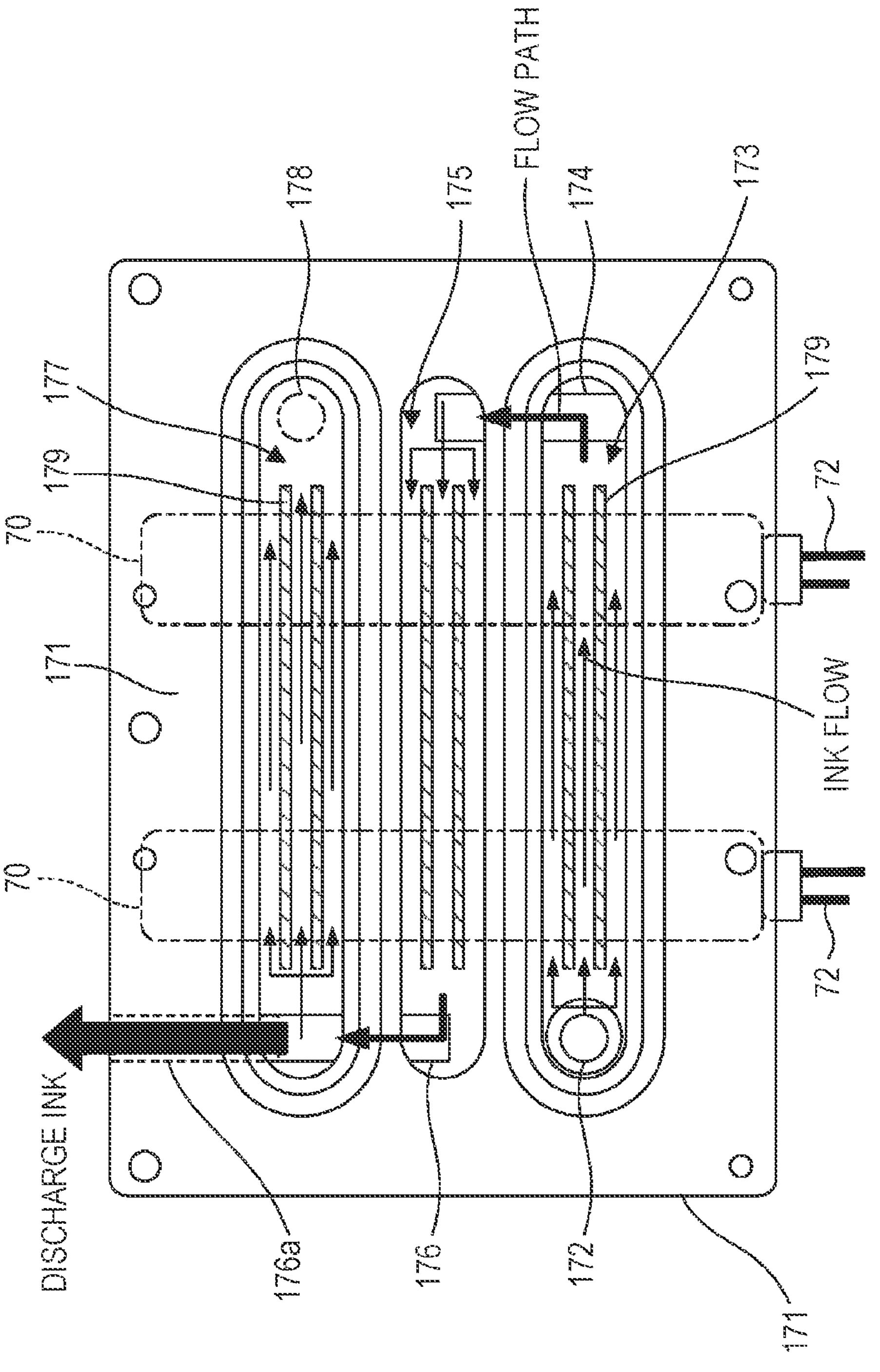
FIG. 4 is a plan view illustrating a configuration of a main part of a heating flow path unit of a lowermost stage in an ink heater in the ink supply device of the embodiment.

Among the temperature sensors, the temperature sensor as the outlet temperature detector 37 is provided in the ink heater 17 together with the heater 70 (see FIG. 4).

The outlet temperature detector 37 is provided in the ink heater 17, and detects the temperature of the ink flowing through a plurality of ink outlets 146*a* through which the ink flows to the first sub-tank 18. The detected temperature is output to the controller 40.

In addition, among the temperature sensors, the temperature sensors as the temperature detector group 39 detect a temperature when arranged, and outputs the temperature to the controller 40. The temperature detector group 39 includes temperature sensors serving as a plurality of detectors that individually detect temperatures in the ink storage tank 16, the first sub-tank 18, the second sub-tank 19, and the inkjet head 242.

The controller 40 executes control to adjust the output (the calorific value) of the heating source on the basis of the ink temperature detected by the temperature sensor.

In particular, the controller 40 adjusts the temperature of the ink flowing out of the heater 17 on the basis of the ink temperature detected by the temperature sensor.

The ink storage tank 16 functions as a main tank that contains or stores ink on the most upstream side of the ink flow path. In FIG. 3, the ink storage tank 16 actually has a large capacity capable of storing 10 L or more, for example, 30 L of ink.

In general, in the ink supply device 15, the ink heater 17 to be described in detail later communicates with the downstream of the ink storage tank 16, and the first sub-tank 18 communicates with an outflow port 176*a* of the ink heater 17 through the tube t3. As an example of a valve that is connected to each of the plurality of outflow ports of the heater 17 and can open and close each ink outflow port, the electromagnetic valve 154 (154*a* to 154*c*) that opens and closes the ink outflow port is disposed in the tube t3.

The electromagnetic valve of the tube t3 connected to the ink outflow port 176*a* through which the ink with the highest temperature flows out is a N.O valve 154*c* that is normally opened (closed at the time of energization), and the electromagnetic valves of the tube t3 connected to the outflow ports through which the ink with the other temperatures flows out are N.O valves 154*a* and 154*b* that are normally closed (opened at the time of energization).

The first sub-tank 18 stores the ink supplied from the ink storage tank 16 (the main tank) at the time of image formation, and mainly supplies the stored ink to the plurality of inkjet heads 242 provided on the downstream side through the tube t4. The first sub-tank 18 is connected to the second sub-tank 19 via the pump 155, and can supply ink thereto. The first sub-tank 18 and the inkjet head 242 are connected via the tube t4.

The second sub-tank 19 communicates with the first sub-tank 18 via a tube having the pump 155, and also communicates with an ink outflow port (a return port) of the corresponding inkjet head 242 via the tube t5.

The second sub-tank 19 can collect the remaining ink of the ink supplied from the first sub-tank 18 to the inkjet head 242, that is, the ink that has not been ejected by the inkjet head 242 through the tube t5 by the operation of the pump 155 or the like. The collected ink is supplied to the ink heater 17 via the tube t6.

Furthermore, the second sub-tank 19 may return (collect) the ink collected from the inkjet head 242 into the first sub-tank 18 by the action of the pump 155 or the like. The collected ink is supplied from the heater 17 to the first sub-tank 18 via the tube t3. The ink returned from the second sub-tank 19 to the first sub-tank 18 is supplied again from the first sub-tank 18 to the inkjet head 242 through the tube t4 and the like to be reused.

For the sake of simplicity, only four inkjet heads 242 are illustrated in FIG. 3, but in practice, more inkjet heads 242 can be added. In this case, the second sub-tank 19 and the tubes t4 to t6 whose number is equal to the number of the inkjet heads 242 added may be added.

In the inkjet head 242, the ink outflow port (the return port) communicates with the second sub-tank 19 via the tube t5, the tube t5 is connected to the tube t6, and the inkjet head 242 communicates with the first sub-tank 18 via the tube t6. A normally closed N.O valve 157 that opens and closes the flow path between the inkjet head 242 and the heater 17 is disposed in the tube t6.

The tube t5 and the tube t6 form a return flow path from the inkjet head 242. The tube t5 includes the normally closed N.O valve 156 that controls the return of ink from each inkjet head 242 to the second sub-tank 19 or the heater 17.

In a conventional ink supply device, the room-temperature ink stored (contained) in the ink storage tank 16 is supplied to the first sub-tank 18, and the ink is heated by a heating source (not illustrated) such as the heater provided in the first sub-tank 18, which is described above. Furthermore, the heating source that heats the ink in the ink storage tank 16 may be provided. In these configurations, there is a problem that temperature unevenness (variations in ink temperature) occurs in the ink in the first sub-tank 18.

Specifically, the temperature distribution based on the position of ink in the first sub-tank 18 (in other words, the distance to the heating source) is generated, so that the temperature of the ink supplied from the first sub-tank 18 to each inkjet head 242 may vary (a temperature difference may occur). The occurrence of variations in the temperature of the ink ejected from each inkjet head 242 may cause deterioration in image quality at the time of image formation or ink drying (curing), leading to the occurrence of image defects.

In order to cope with this, an attempt has been made to cope with this by devising the arrangement of the heating source in the first storage tank 18, temperature control by the heating source of the ink storage tank 16, or the like, but a sufficient effect has not been obtained. The ink temperature control can also be executed in the inkjet head 242 as long as the inkjet head 242 includes a heating source such as a heater, a temperature sensor, and the like. However, in a case where the temperature control of the ink is executed immediately before the image formation, there is a problem that the ink is likely to be excessively heated.

In order to cope with these problems, the ink supply device 15 according to the first embodiment includes "ink heater 17" that heats ink before the ink supplied from the ink storage tank 16 flows into the first sub-tank 18. The ink heater 17 can quickly supply ink with various different temperatures, that is, ink with different viscosities to the first sub-tank 18.

In this manner, the ink supply device 15 adjusts the ink appropriately adjusted in advance at various temperatures to a suppliable state on the upstream side of the first sub-tank 18, and does not perform heating (eliminates the amount of heating performed) by the heating source in the first sub-tank 18 or reduces the amount as much as possible.

The ink supply device 15 controls the pump 152, the electromagnetic valves 153, 154*a* to 154*c*, and 156, and the pump 155 to control the ink flow path. The ink supply device 15 can supply ink with a suitable temperature from the ink storage tank 16 to the first sub-tank by controlling the ink flow path.

According to the ink supply device 15, the temperature of ink is raised in the ink flow path for supplying ink to the plurality of inkjet heads 242 on the upstream side of the first sub-tank 18, and the ink is supplied to the first sub-tank 18 through the flow path (the tube t3) selected based on the ink whose temperature has risen to a desired temperature.

The ink stored in the first sub-tank 18 is ink with a temperature appropriately set. That is, the temperature unevenness of the ink supplied to each inkjet head 242 in a branched manner from the outlet of the first sub-tank 18, and the temperature unevenness of the ink ejected from the inkjet head 242 can be suppressed or minimized. In addition, the output (the required calorific value) of the heating source of the first sub-tank 18, in other words, the power to be supplied to the heating source of the first sub-tank 18, for eliminating the temperature unevenness, can be reduced to the minimum necessary, or the heating source of the first sub-tank 18 can be omitted.

The ink heater 17 includes an ink inflow port (an inlet portion) connected to the ink storage tank 16 via the tube t1, a flow path (corresponding to the tube t2) for heating, and a plurality of ink outflow ports (outlet portions) provided midway in the flow paths and connected to the first sub-tank 18 via the tubes t3.

The ink heater 17 is configured by staking a plurality of heating flow path units (blocks) 17A to 17C constituting the flow path. The ink heater 17 is configured in such a manner that the temperature of the ink entering through the ink inflow port of the lower stage increases as the ink flows from the lower stage side to the upper stage side, and reaches the required maximum temperature in the uppermost stage.

Figure 5:
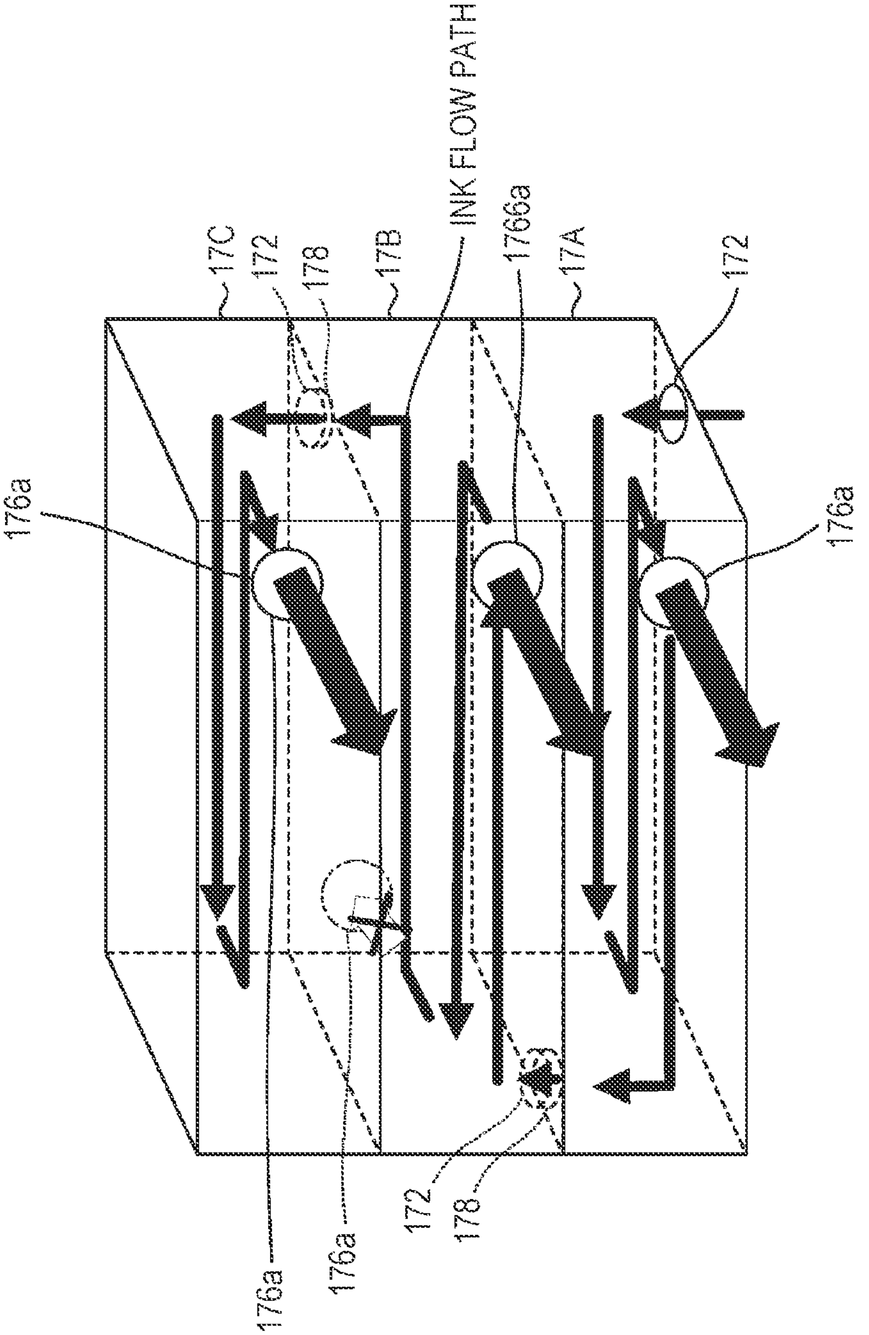
FIG. 5 is a perspective view schematically illustrating a flow path of the ink heater illustrated in FIG. 4.

Hereinafter, the configuration of the ink heater 17 will be described in detail with reference to FIGS. 4 to 6.

FIG. 4 is a plan view illustrating a configuration of a main part of a heating flow path unit of a lowermost stage in an ink heater in the ink supply device of the first embodiment. FIG. 4 illustrates the heating flow path unit 17A of the lowermost stage in the ink heater 17. FIG. 5 is a perspective view schematically illustrating a flow path of the ink heater illustrated in FIG. 4. In practical use, a lid (a cover member) (not illustrated) is attached to the heating flow path unit 17A. For convenience of description, FIG. 4 illustrates a state where the cover member is removed. Furthermore, in a case where when the heating flow path units 17A to 17C are stacked, the upper opening is closed by the lower surface without a gap in such a manner that the flow path therein is partitioned, the cover member does not need to be provided, and the ink inflow port of the upper stage matches the ink outflow port of the lower stage. In this configuration, the top opening is closed by the cover member in the uppermost stage.

The heating flow path units 17B and 17C are configured in a similar manner to the heating flow path unit 17A, and the heating flow path unit 17B is stacked with its horizontal direction changed by 180 degrees to be disposed between the heating flow path unit 17A and the heating flow path unit 17C in a state of being connected to both the heating flow path units, so that one flow path is formed. In FIG. 5, the position of the ink outflow port in the heating flow path unit 17B is changed from the position indicated by the ink outflow port 176*a* to the position indicated by an ink outflow port 1766*a* (for example, a position vertically aligned with the ink outflow ports 176*a* of the heating flow path units 17A and 17C).

The heating flow path unit 17A is a block having upper and lower surfaces that can be stacked, and a flow path connected to an ink inflow port and an ink outflow port arranged in an outer surface is formed inside a main body 171. The heating flow path unit 17A is formed in a rectangular shape in plan view. The heating flow path unit 17A is preferably made of a material with high thermal conductivity, for example, a metal such as aluminum.

The heating flow path unit 17A includes an ink inflow port 172, an ink connection port 178, the ink outflow port 176*a*, and flow path chambers 173, 175, and 177 that connect the ink inflow port 172, the ink connection port 178, and the ink outflow port 176*a* to form a flow path.

The ink inflow port 172 and the ink connection port 178 are provided in surfaces (the upper and lower surfaces) stacked in the main body 171. When another heating flow path unit (the heating flow path unit 17B on the upper side in FIG. 3) is stacked on the heating flow path unit 17A, the ink inflow port 172 and the ink connection port 178 are arranged at positions connected to the ink inflow ports of the flow path in another heating flow path unit stacked.

In the heating flow path unit 17A, the ink inflow port 172 and the ink connection port 178 are arranged so as to be located at diagonal positions in plan view, and are connected to the flow path chambers 173, 175, and 177 and communication portions 174 and 176 in the heating flow path unit 17A to form one flow path.

The ink inflow port 172 and the ink connection port 178 are formed at point-symmetrical positions about the center of the rectangular surface in the main body 171 with a rectangular shape in plan view. As a result, when the heating flow path unit 17B formed in a similar manner to the heating flow path unit 17A is stacked on the heating flow path unit 17A with its horizontal direction changed by 180 degrees, the ink connection port 178 can be connected to the ink inflow port 172 of the heating flow path unit 17B.

The flow path chambers 173, 175, and 177 extend in one direction (a longitudinal direction) inside the main body 171 and have hollow portions arranged in parallel with each other. The flow path chambers 173, 175, and 177 are connected via the communication portions 174 and 176 to form a single meandering flow path together with the communication portions 174 and 176. In the main body 171, the ink inflow port 172 and the ink connection port 178 are opened in the upper and lower surfaces at both ends of the meandering flow path.

Ribs 179 extending along the longitudinal direction are formed upright in the flow path chambers 173, 175, and 177. The rib 179 increases the contact area with the ink flowing in the flow path chambers 173, 175, and 177. By heating the flow path chambers 173, 175, and 177 using the heater 70, the ink flowing through the flow path chambers 173, 175, and 177 flows in contact with the ribs 179, and the temperature can be more effectively raised. Furthermore, the rib 179 guides the flow of ink in such a manner that the ink flows from the side of the ink inflow port 172 to one side in the flow path chambers 173, 175, and 177.

The communication portions 174 and 176 connect the flow path chambers 173, 175, and 177 adjacent to each other. The communication portions 174 and 176 may be configured in any manner as long as the flow path chambers 173, 175, and 177 adjacent to each other communicate with each other. The communication portions 174 and 176 may be cylindrical bodies that allow the flow path chambers 173, 175, and 177 adjacent to each other in the main body 171 to communicate with each other, or may be recessed and notched grooves with a semicircular cross section or the like formed across the flow path chambers 173, 175, and 177 in the main body 171 so as to allow the flow path chambers to communicate with each other.

The communication portion 176 allows one end portion of the flow path chamber 175 and one end portion of the flow path chamber 177 to communicate with each other, and is connected to the ink outflow port 176*a* communicating with the outside in the flow path chamber 177.

The ink outflow port 176*a* is provided midway in the flow path of the heater 17, and flows out the ink at a predetermined temperature by flowing out the ink to the outside midway in the flow path. The ink outflow port 176*a* is provided in each of the heating flow path units 17A to 17C, has an electromagnetic valve (a N.O valve), and is connected to the first sub-tank 18 via each of the electromagnetic valves (N.O valves) 154*a* to 154*c*.

In the heating flow path unit 17A, the heaters 70 are arranged so as to entirely heat the flow path chambers 173, 175, and 177. In FIG. 4, the direction of the heaters 70 with respect to the heating flow path unit 17B may be changed in the horizontal direction of the heating flow path unit 17B, and the heaters may be arranged in such a manner that cables 72 are led out from the side portion on the side of the ink outflow port 176*a* to the outside.

For example, an example of the configuration of the heating flow path unit 17B will be described using the heating flow path unit 17A in FIG. 4. In the configuration of the heating flow path unit 17A, the ink outflow port 176*a* connected to the communication portion 176 is closed, and the ink outlet port that is connected to the communication portion 174 and allows the communication portion 174 to communicate with the outside is formed. The heating flow path unit 17B configured as described above is disposed and stacked on the heating flow path unit 17A with its direction changed by 180 degrees in such a manner that the ink connection port 178 of the heating flow path unit 17A and the ink inflow port 172 of the heating flow path unit 17B are connected to each other, and the heating flow path unit 17C is stacked thereon. The heating flow path unit 17C is configured in a similar manner to the heating flow path unit 17A, and when the heating flow path unit 17C is placed on the heating flow path unit 17B in the same direction as the heating flow path unit 17A, the ink connection port 178 of the lower stage and the ink inflow port 172 of the upper stage are connected, so that the heater 17 is formed. Furthermore, in the heater 17, the ink connection port 178 on the upper surface of the heating flow path unit 17C is closed. As described above, the heating flow path units constituting the individual stages having the flow path and the ink outflow port 176*a* from the flow path in the heater 17 are similarly formed. As a result, the length of the flow path to be heated can be adjusted, that is, the number of ink streams with different temperatures to be supplied to the first sub-tank can be easily increased or decreased, and the manufacturing cost of the configuration can be reduced.

Figure 6:
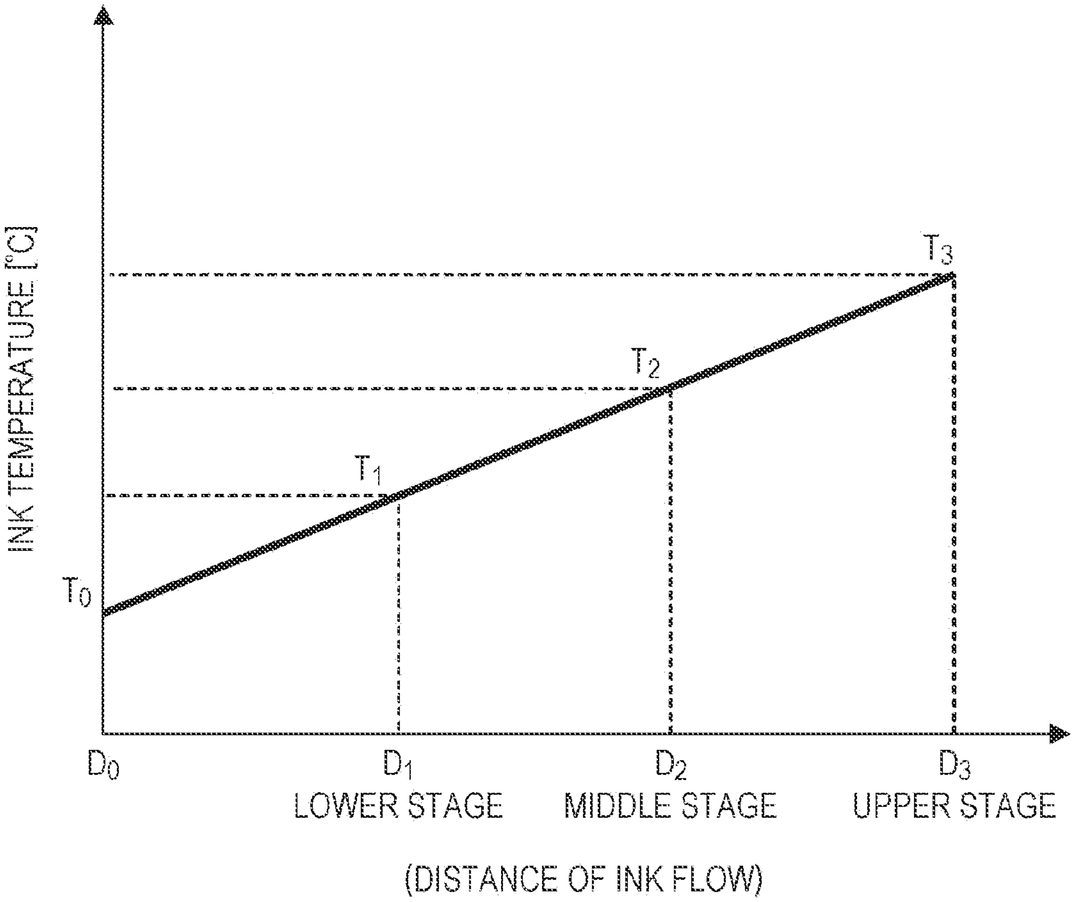
FIG. 6 is a characteristic graph for explaining a relationship between a heating flow path unit of each stage and an ink temperature.

FIG. 6 is a characteristic graph for explaining the relationship between each stage and an ink temperature.

As shown in FIG. 6, in the ink heater 17, the ink supplied from the ink storage tank 16 enters the inside through the ink inflow port 172 of the lower stage, passes through the flow path, and the ink temperature increases as the ink goes up to the upper stage. That is, the temperature of the ink passing through the flow path is raised by increasing the length of the flow path. In the ink heater 17, the ink with different temperatures flows in three stages, and temperatures $T_1$, $T_2$, and $T_3$ of the ink flowing through flow paths with lengths $D_1$, $D_2$, and $D_3$ continuing from the lower stage to the middle and upstream become higher in proportion to the length of the ink flow.

As a result, in the heater 17, the length of the ink flow path to be heated can be increased by stacking the heating flow path units 17A to 17C in a plurality of stages, so that the temperature width of the ink can be made large and the ink with different temperatures in a wide range can be supplied to the first sub-tank 18.

<Effects>

The ink supply device 15 of the inkjet image forming apparatus 1 heats ink before the ink is supplied from the ink storage tank 16 to the first sub-tank 18 in the carriage 60, and then supplies the ink to the first sub-tank 18. As a result, the temperature unevenness of the ink ejected from the inkjet heads 242 can be suppressed.

Furthermore, in the inkjet image forming apparatus 1, in a case where the inkjet head 242 is cooled immediately after the power supply is started up, or the like, the ink supply device 15 supplies the ink from the ink outflow port 176*a* of the heating flow path unit 17C of the uppermost stage, which has the highest temperature.

Then, when the temperature inside the apparatus reaches a stable temperature, the ink is switched to the ink from the heating flow path unit 17B of the middle stage and supplied to the first sub-tank 18. As a result, the ink with a lower temperature than before is supplied to the inkjet head 242, and the temperature of the ink can be lowered.

In a case where the temperature of the inkjet head 242 is too high due to printing such as continuous ejection with high coverage, the ink supply device 15 supplies ink from the heating flow path unit 17A of the lower stage. As a result, the ink temperature of the inkjet head 242 can be more effectively lowered.

Furthermore, in the ink supply device 15, a plurality of the ink outflow ports 176*a* are provided midway in the ink flow path to be heated, and the ink with different temperatures is supplied to the first sub-tank 18 through these ink outflow ports 176*a*.

Therefore, in the valves of the ink outflow ports 176*a* from which the ink with different temperatures flows out, a plurality of valves can be combined and opened at once and supplied to the first sub-tank 18. That is, since a plurality of ink streams with different temperatures are caused to flow into the first sub-tank 18, and the ink is mixed therein and the temperature is adjusted, it is possible to supply more ink with different temperatures than the ink flowing out of the individual upper, middle, and lower stages. That is, the ink with different temperatures whose number is equal to or more than the number of temperatures corresponding to the number of stages can be supplied to the first sub-tank 18 to become the ink with a more suitable temperature and supplied to the inkjet head 242, and the ink can be ejected without temperature unevenness.

Furthermore, the ink supply device 15 can cause the ink with a temperature corresponding to a coverage amount to flow out of the heater 17 and supply the ink to the first sub-tank 18, so that the temperature of the inkjet head 242 that rises depending on the increase in the coverage amount can be lowered to a suitable temperature, and the ink can be ejected.

Further, the ink supply device 15 can cause the ink with the temperature corresponding to the detected temperature to flow out of the heater 17 on the basis of the temperature detected by the temperature detector group 39, and supply the ink to the first sub-tank 18. As a result, the temperature unevenness of the plurality of inkjet heads 242 can be eliminated, and the ink can be ejected at a suitable temperature. Furthermore, the inkjet heads 242 ejecting different colors can eject the ink of different colors with the temperatures lowered to the same suitable temperature.

The heating flow path units 17A to 17C are stacked and connected to each other, so that the individual flow paths are continuously formed as a single flow path. By stacking the heating flow path units 17A to 17C in a plurality of stages, the length of the flow path to be heated is increased, and the ink can flow out to the outside with the appropriate length of the flow path. As a result, the temperature range of the ink to flow out can be widened. Each of the heating flow path units 17A to 17C includes the heater 70 for heating the flow path. The heater 70 is connected to the controller 40 via the cable 72.

According to the inkjet image forming apparatus 1, the ink with a viscosity suitable for the ejection from the inkjet head 242 can be quickly supplied to the inkjet head 242, and the temperature unevenness of the ink can be suppressed.

In the ink supply device 15, since the flow path to be heated is adjusted to change the temperature of the ink, it is not necessary to variably control the temperature of the heater 70 for heating the ink, the configuration is simple, and the manufacturing cost can be reduced.

Second Embodiment

Figure 7:
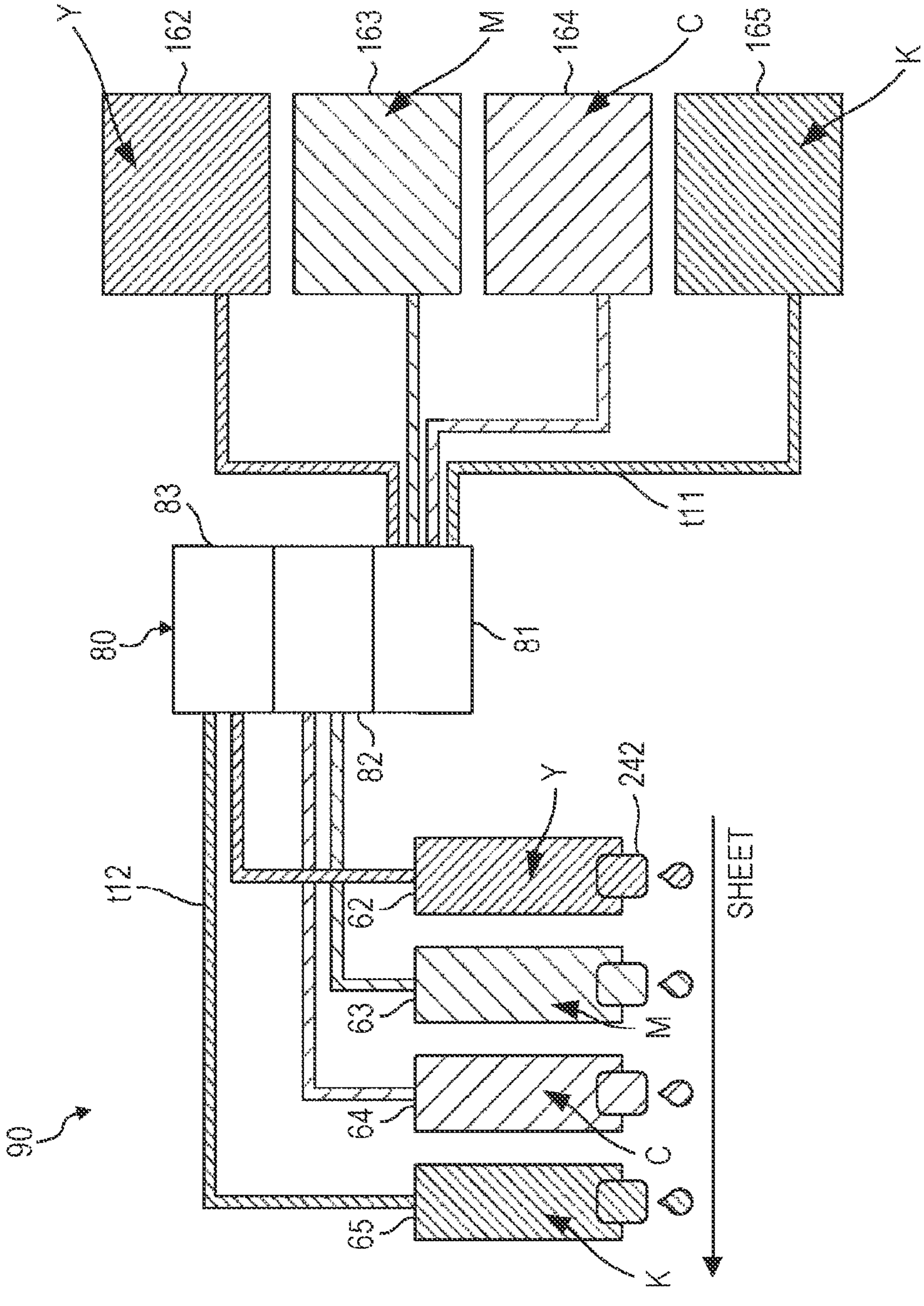
FIG. 7 is a schematic diagram for explaining a schematic configuration of an ink supply device in a second embodiment.
Figure 8:
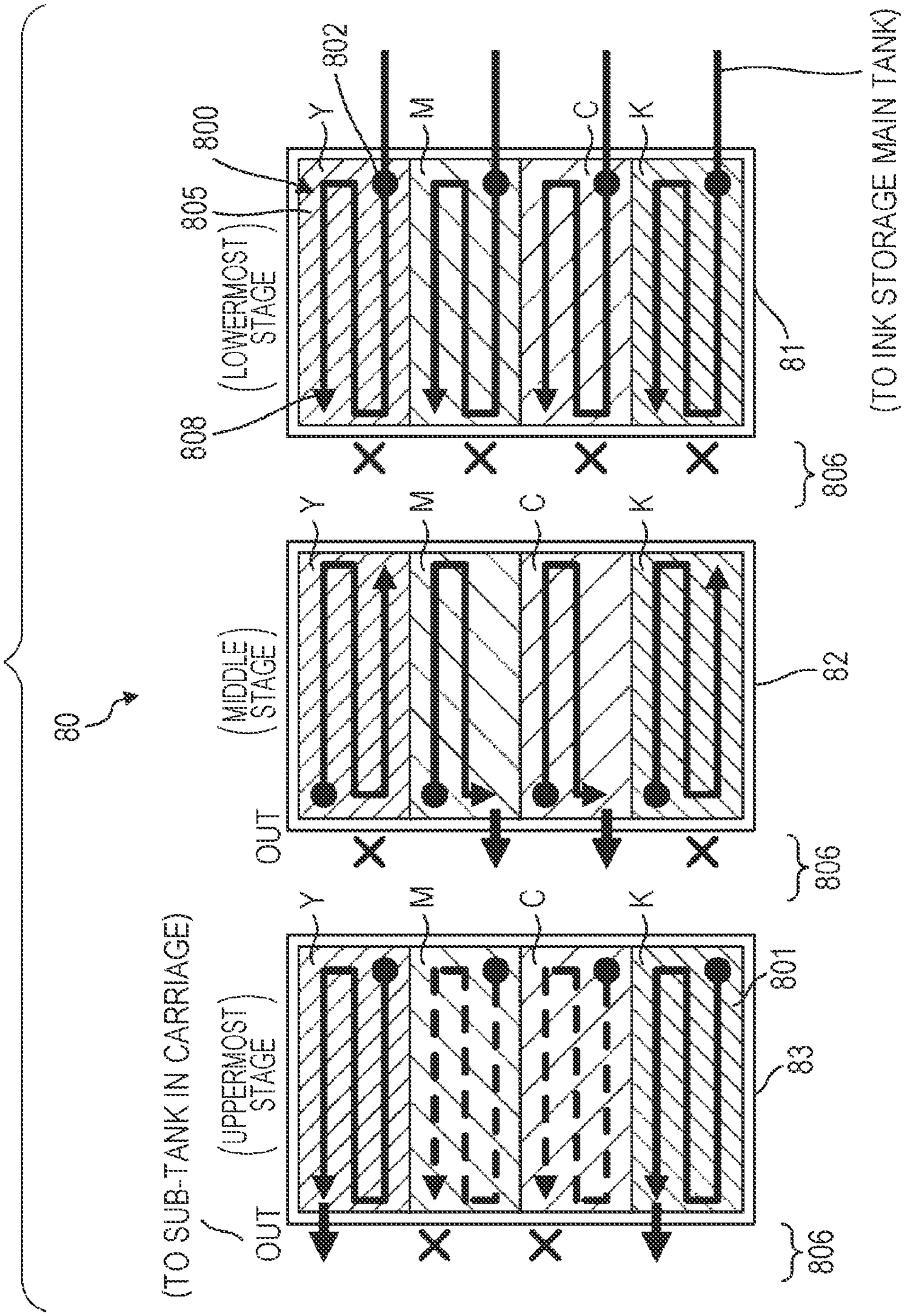
FIG. 8 is a plan view schematically illustrating an example of an ink heater in the ink supply device in the second embodiment.

FIG. 7 is a schematic view for explaining a schematic configuration of an ink supply device in a second embodiment, and FIG. 8 is a plan view schematically illustrating an example of an ink heater in the ink supply device in the second embodiment. FIG. 8 is a diagram viewed from an arrow A in FIG. 7.

An ink supply device 90 illustrated in FIG. 7 is different from the ink supply device in the inkjet image forming apparatus 1 illustrated in FIG. 1 only in its configuration and the carriage, and other basic configurations are similar.

The ink supply device 90 includes a plurality of ink storage tanks 162 to 165 for the individual colors, carriages 62 to 65 having the inkjet heads 242 for the individual colors, and a heating device 80 interposed between the ink storage tanks 162 to 165 and the carriages 62 to 65.

The ink storage tanks 162 to 165 store ink of four different colors of yellow (Y), magenta (M), cyan (C), and black (K), and the ink is supplied to the heating device 80 via a tube t11 by a pump (not illustrated). An electromagnetic valve (normally-closed N.O valve, not illustrated) capable of stopping the supply of ink from each of the ink storage tanks 162 to 165 is disposed in the tube t11.

The carriages 62 to 65 are configured similarly to the carriage 60 illustrated in FIG. 3, and each include a sub-tank that temporarily stores ink and the inkjet head 242 that ejects the ink supplied from the sub-tank. The carriages 62 to 65 each include a temperature detector that detects the temperature of the sub-tank, and the controller (see FIG. 2) controls the temperature of the ink flowing out of the heating device 80 on the basis of a temperature detection result.

In the carriages 62 to 65 in FIG. 7, yellow (Y), magenta (M), cyan (C), and black (K) carriages 62 to 65 are arranged side by side so as to be adjacent to each other. The ink temperatures in the carriages 62 to 65 are set to the same temperature. However, when driven, the inner carriages 63 and 64 sandwiched between the carriages 62 and 65 are less likely to release heat than the outer carriages 62 and 65. As a result, the temperatures of ink magenta (M) and cyan (C) stored in the inner carriages 63 and 64 become higher than the temperatures of ink yellow (Y) and black (K) stored in the outer carriages 62 and 65.

The heating device 80 integrally have flow paths for ink of four colors of yellow (Y), magenta (M), cyan (C), and black (K) partitioned by partition walls.

The heating device 80 has flow path stage units 81 to 83 each having a heating flow path unit 800 for each color, and the flow path stage units 81 to 83 are stacked so as to connect the flow paths of the heating flow path units 800 for each color.

The heating device 80 includes a heater (for example, a heater similar to the heater 70 of the first embodiment) for heating the flow path of the heating flow path unit 800 in each of the flow path stage units 81 to 83.

The heating flow path unit 800 is similar to the heating flow path unit 17A illustrated in FIG. 4, and includes therein a flow path, an ink inflow port 802 and an ink connection port 808 connected to both ends of the flow path, and an ink outflow port 806 through which the ink in the flow path flows out.

According to the flow path stage units 81 to 83 of the heating device 80, in the flow path stage unit 81 of the lower stage, the tubes t11 connected to the ink storage tanks 162 to 165 are connected to the ink inflow ports of the different heating flow path units 800 for different colors. As a result, the ink corresponding to each color is supplied from each of the ink storage tanks 162 to 165 to each heating flow path unit 800 of the flow path stage unit 81.

Similarly to the heating flow path unit 17A, the heating flow path unit 800 is configured to form a single flow path when stacked. Furthermore, an electromagnetic valve that can be appropriately opened and closed is attached between each ink outflow port 806 of the heating flow path unit 800 in the flow path stage units 81 to 83 and a connected tube t12. As a result, the ink can be appropriately selected from the ink outflow ports 806 of the heating flow path units 800 in the flow path stage units 81 to 83 and supplied to the carriages 62 to 65.

In the ink supply device 90 illustrated in FIGS. 7 and 8, the temperature of magenta (M) and cyan (C) stored respectively in the inner carriages 63 and 64 sandwiched between the carriages 62 and 65 on both sides is higher than that of yellow (Y) and black (K) stored in the outer carriages.

Therefore, in the heating device 80, in order to increase the temperature of the ink flowing through the flow path therein, the ink outflow ports 806 of the flow path stage unit 81 of the lowermost stage are closed, and the ink of each color is caused to flow into the flow path inside the heating flow path unit 800 of each color to flow into each of the heating flow path units 800 of the middle stage and the upper stage.

Since the temperature of magenta (M) and cyan (C) is higher than that of yellow (Y) and black (K), in the heating device 80, magenta (M) and cyan (C) flow out at the temperature of the flow path stage unit 82 of the middle stage, and yellow (Y) and black (K) flow out at the temperature of the flow path stage unit 83 of the upper stage. That is, ink with a temperature lower than that of the ink supplied to the carriages 62 and 65 is supplied to the carriages 63 and 64.

Ink with different temperatures (the temperature of the ink in the carriages 62 and 65 is lower than that in the carriages 63 and 64) is supplied to the sub-tanks of the carriages 62 to 65, and the temperature of the ink in the carriages 63 and 64 can be lowered to be similar to the temperature of the ink in the carriages 62 and 65.

As a result, the temperature unevenness of the ink ejected from the inkjet heads 242 can be suppressed. As a result, a more suitable image can be formed. In the heating device 80, the ink outflow port 806 for each color in each of the flow path stage units 81 to 83 can be appropriately opened and closed.

Therefore, when the temperature suitable for the carriages 62 to 65 is set or the temperature of the ink of the inkjet head 242 is set to an arbitrary temperature, the ink outflow ports can be appropriately and selectively opened to supply the ink with a desired temperature to the carriages 62 to 65 of the individual colors. As a result, the temperature of the ink ejected by the inkjet head 242 can be effectively adjusted with a simple configuration and control.

As described above, even in a case where ink with different temperatures is required as the ink ejected by the inkjet heads 242, by supplying ink with an appropriate temperature, the inkjet head 242 can eject ink with a suitable temperature at which temperature unevenness is suppressed, that is, ink with a suitable viscosity.

In addition, the above embodiments are merely examples of implementation in carrying out the present invention, and the technical scope of the present invention should not be interpreted in a limited manner by these embodiments. That is, the present invention can be implemented in various forms without departing from the gist or main features thereof.

According to the inkjet image forming apparatus relating to the present disclosure, the temperature unevenness of ink can be suppressed by rapidly supplying the ink with a viscosity suitable for the ejection to the inkjet head.

Although embodiments of the present invention have been described and illustrated in detail, the disclosed embodiments are made for purposes of illustration and example only and not limitation. The scope of the present invention should be interpreted by terms of the appended claims

What is claimed is:

1. An ink supply device comprising:

a main tank that stores ink;

a sub-tank that stores the ink supplied from the main tank and supplies the ink stored to a plurality of inkjet heads connected; and a heater that heats the ink before the ink flows into the sub-tank, wherein the heater includes a plurality of ink outlet ports that can supply the ink with different temperatures to the sub-tank midway in a flow path of the ink to be heated.

2. The ink supply device according to claim 1, wherein the heater includes a plurality of flow path valves that can open and close the plurality of ink outlet ports, and the plurality of ink outlet ports supply the ink heated to the sub-tank by switching the flow path valve.

3. The ink supply device according to claim 2, wherein the heater includes an outlet temperature detector that detects an ink temperature of the ink flowing through the plurality of ink outlet ports, and the plurality of ink outlet ports supply the ink to the sub-tank via the flow path valve switched on a basis of a temperature detected by the outlet temperature detector.

4. The ink supply device according to claim 1, wherein the plurality of ink outlet ports supply a plurality of ink streams with different temperatures at one time.

5. An image forming apparatus comprising:

the ink supply device according to claim 1; and a carriage that integrally includes the inkjet head that ejects the ink supplied from the ink supply device toward a recording medium and the sub-tank.

6. The image forming apparatus according to claim 5, further comprising an atmosphere detector that detects an ambient temperature in a main body of the image forming apparatus in which the carriage is disposed, wherein the heater includes a plurality of flow path valves that can open and close the plurality of ink outlet ports, and the ink supply device supplies the ink to the sub-tank by switching the flow path valve on a basis of the ambient temperature detected.

7. The image forming apparatus according to claim 5, further comprising a coverage detector that detects coverage of a recorded image, wherein the heater includes a plurality of flow path valves that can open and close the plurality of ink outlet ports, and the ink supply device supplies the ink to the sub-tank by switching the flow path valve on a basis of coverage detected.

8. The image forming apparatus according to claim 5, further comprising a temperature detector that detects a downstream ink temperature in a flow path from the sub-tank to the inkjet head and in the inkjet head, wherein the heater includes a plurality of flow path valves that can open and close the plurality of ink outlet ports, and supplies the ink by switching the flow path valve on a basis of the downstream ink temperature detected.

9. The image forming apparatus according to claim 5, further comprising at least one detector of an atmosphere detector that detects an ambient temperature in a main body of the image forming apparatus, a coverage detector that detects coverage of a recorded image, or a temperature detector that detects an ink temperature in a flow path from the sub-tank to the inkjet head and in the inkjet head, wherein the heater includes a plurality of flow path valves that can open and close the plurality of ink outlet ports, and supplies the ink by switching the flow path valve on a basis of a detection result by the at least one detector.

10. The image forming apparatus according to claim 5, wherein a temperature of the ink supplied from the ink outlet port of the heater is equal to or lower than an ink temperature in the sub-tank.

* * * * *